US010635667B2

(12) United States Patent
Ding et al.

(10) Patent No.: US 10,635,667 B2
(45) Date of Patent: Apr. 28, 2020

(54) AUTOMATIC INSIGHTS FOR MULTI-DIMENSIONAL DATA

(71) Applicant: MICROSOFT TECHNOLOGY LICENSING, LLC, Redmond, WA (US)

(72) Inventors: Rui Ding, Beijing (CN); Shi Han, Beijing (CN); Dongmei Zhang, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 141 days.

(21) Appl. No.: 15/739,132

(22) PCT Filed: Jun. 29, 2015

(86) PCT No.: PCT/CN2015/082638
§ 371 (c)(1),
(2) Date: Dec. 21, 2017

(87) PCT Pub. No.: WO2017/000114
PCT Pub. Date: Jan. 5, 2017

(65) Prior Publication Data
US 2018/0357276 A1 Dec. 13, 2018

(51) Int. Cl.
*G06F 17/00* (2019.01)
*G06F 16/2453* (2019.01)
(Continued)

(52) U.S. Cl.
CPC ......... *G06F 16/2453* (2019.01); *G06F 16/26* (2019.01); *G06F 16/283* (2019.01); *G06Q 10/06* (2013.01)

(58) Field of Classification Search
CPC ............... G06F 16/2453; G06Q 10/06
(Continued)

(56) References Cited

U.S. PATENT DOCUMENTS 7,899,776 B2 * 3/2011 Crivat ............... G06F 16/283
706/60
8,165,853 B2 4/2012 Pinto et al.
(Continued)

FOREIGN PATENT DOCUMENTS

CN 102332056 A 1/2012

OTHER PUBLICATIONS

"Delivering Actionable Customer Intelligence", In White Paper, Aug. 5, 2013, 12 Pages.
(Continued)

*Primary Examiner* — Isaac M Woo
(74) *Attorney, Agent, or Firm* — Merchant & Gould

(57) ABSTRACT

Automatically identifying insights from a dataset and presenting the insights graphically and in natural language text ranked by importance is provided. Different data types and structures in the dataset are automatic recognized and matched with a corresponding specific analysis type. The data is analyzed according to the determined corresponding analysis types, and insights from the analysis are automatically identified. The insights within a given insight type and between insight types are ranked and presented in order of importance. Insights include those having multiple pipelined attributes and other insights include multiple insights identified as having some relationship for the included insights.

20 Claims, 6 Drawing Sheets

(51) Int. Cl.
    *G06F 16/28*     (2019.01)
    *G06F 16/26*     (2019.01)
    *G06Q 10/06*     (2012.01)

(58) Field of Classification Search
    USPC .................................................. 707/600–899
    See application file for complete search history.

(56) References Cited

U.S. PATENT DOCUMENTS

| | | |
|---|---|---|
| 8,370,181 B2 | 2/2013 | Shah-Hosseini |
| 2009/0327852 A1 | 12/2009 | MacGregor et al. |
| 2010/0175019 A1 | 7/2010 | Sitton et al. |
| 2011/0106581 A1 | 5/2011 | Rohrbasser et al. |
| 2012/0173985 A1 | 7/2012 | Peppel |
| 2013/0091132 A1 | 4/2013 | Khalatov et al. |
| 2013/0275905 A1 | 10/2013 | Bhaskaran et al. |
| 2014/0032553 A1 | 1/2014 | Chu et al. |
| 2014/0258311 A1 | 9/2014 | Hamborg et al. |
| 2014/0282184 A1 | 9/2014 | Dewan et al. |

OTHER PUBLICATIONS

"IBM I2 Enterprise Insight Analysis V1.0.9 Offers Expanded Capability Together with Advanced, High-Speed, Multidimensional Analytics for Faster and More Informed Decision Makings", Retrieved From: https://www-01.ibm.com/common/ssi/rep_ca/1/872/ENUSAP14-0461/ENUSAP14-0461.PDF, Dec. 9, 2014, 11 Pages.

Dong, et al., "Mining Multi-Dimensional Constrained Gradients in Data Cubes", In Proceedings of 27th International Conference on Very Large Data Bases, Sep. 11, 2001, pp. 321-330.

Frederick, Scott, "Telling Stories with Data: The Limitations of Infographics and the Power of Words", Retrieved From: https://www.scoop.it/t/infographics-and-awesome, Apr. 22, 2013, 6 Pages.

Han, et al., "Constraint-Based Multidimensional Data Mining", In Journal of IEEE Computer, vol. 32, Issue 8, Aug. 1999, pp. 46-50.

Li, et al., "Mining Approximate Top-K Subspace Anomalies in Multi-Dimensional Time-Series Data", In Proceedings of the 33rd International Conference on Very Large Data Bases, Sep. 23, 2007, pp. 447-458.

Myatt, Justin, "Data Warehouse Augmentation, Part 4: Use Big Data Technologies for Initial Data Exploration", In Technical Library, Mar. 30, 2015, 7 Pages.

Qin, et al., "Discovering Business Insights from Multi-Dimensional Data to Strengthen Enterprise Competitiveness: A Case Study in Manufacturing Industry", In Proceedings of IEEE International Conference on Service Operations and Logistics, and Informatics, Jul. 28, 2013, pp. 512-517.

Vartak, et al., "SEEDB: Automatically Generating Query Visualizations", In Journal of the Proceedings of the VLDB Endowment, vol. 7, Issue 13, Aug. 2014, pp. 1581-1584.

Wu, et al., "Promotion Analysis in Multi-Dimensional Space", In Journal of the Proceedings of the VLDB Endowment, vol. 2, Issue 1, Aug. 2009, pp. 109-120.

"Supplementary European Search Report Issued in European Patent Application No. 15896645.7", dated Dec. 13, 2018, 7 Pages.

International Search Report and Written Opinion for PCT/CN2015/082638, dated Mar. 17, 2016.

"First Office Action Issued in Chinese Patent Application No. 201580056272.6", dated Jan. 3, 2020, 13 Pages.

\* cited by examiner

AUTOMATIC INSIGHTS FOR MULTI-DIMENSIONAL DATA

CROSS-REFERENCE TO RELATED APPLICATION

This application is a U.S. National Stage Application of PCT/CN2015/082638, filed Jun. 29, 2015, which application is hereby incorporated by reference. To the extent appropriate, a claim of priority is made to the above disclosed application.

BACKGROUND

Multi-dimensional data is a typical and prevalent type of data for analysis tasks such as Business Intelligence analysis. As used herein, multi-dimensional data is data organized in a tabular format (i.e., multi-dimensional table) that includes a set of records as rows in the table, and each record is represented by a set of properties as columns in the table. Such analysis tasks result in reports summarizing insights obtained from the data being analyzed. Desirable analysis reports include various types of insights, which are typically discovered by human exploration of the multi-dimensional data assisted by some automatic data mining techniques. However, such insight discovery tasks are typically difficult and time consuming due to the complexity of multi-dimensional data analysis and the lack of comprehensive mining technology for various insights reduces a user ability to fully interact with multi-dimensional data.

SUMMARY

Concepts and technologies are described herein for providing an automated mechanism that provides systematic and comprehensive insight mining of multi-dimensional data.

An example computing device that provides the automated mechanism includes a processor and a memory having computer-executable instructions stored thereupon. The computer-executable instructions, when executed by the processor, cause the computing device to access multi-dimensional data and receive auto-generated insights related to data subspaces within a data set.

Multi-dimensional data analysis with auto insights, specifically by using insights that are automatically mined provide hints, guides, and proceed the analysis flow, in hope of approaching desirable analysis results more quickly. Desirable insights may have the following characteristics, A proper unit of knowledge discovered from the data being analyzed, as natural building block of analysis flow and resultant report Informative as either surprising/interesting/important facts or supporting/explanatory facts, as hints and clues to seamlessly connect and interact with data exploration It should be appreciated that the above-described subject matter may also be implemented as a computer-controlled apparatus, a computer process, a computing system, or as an article of manufacture, such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
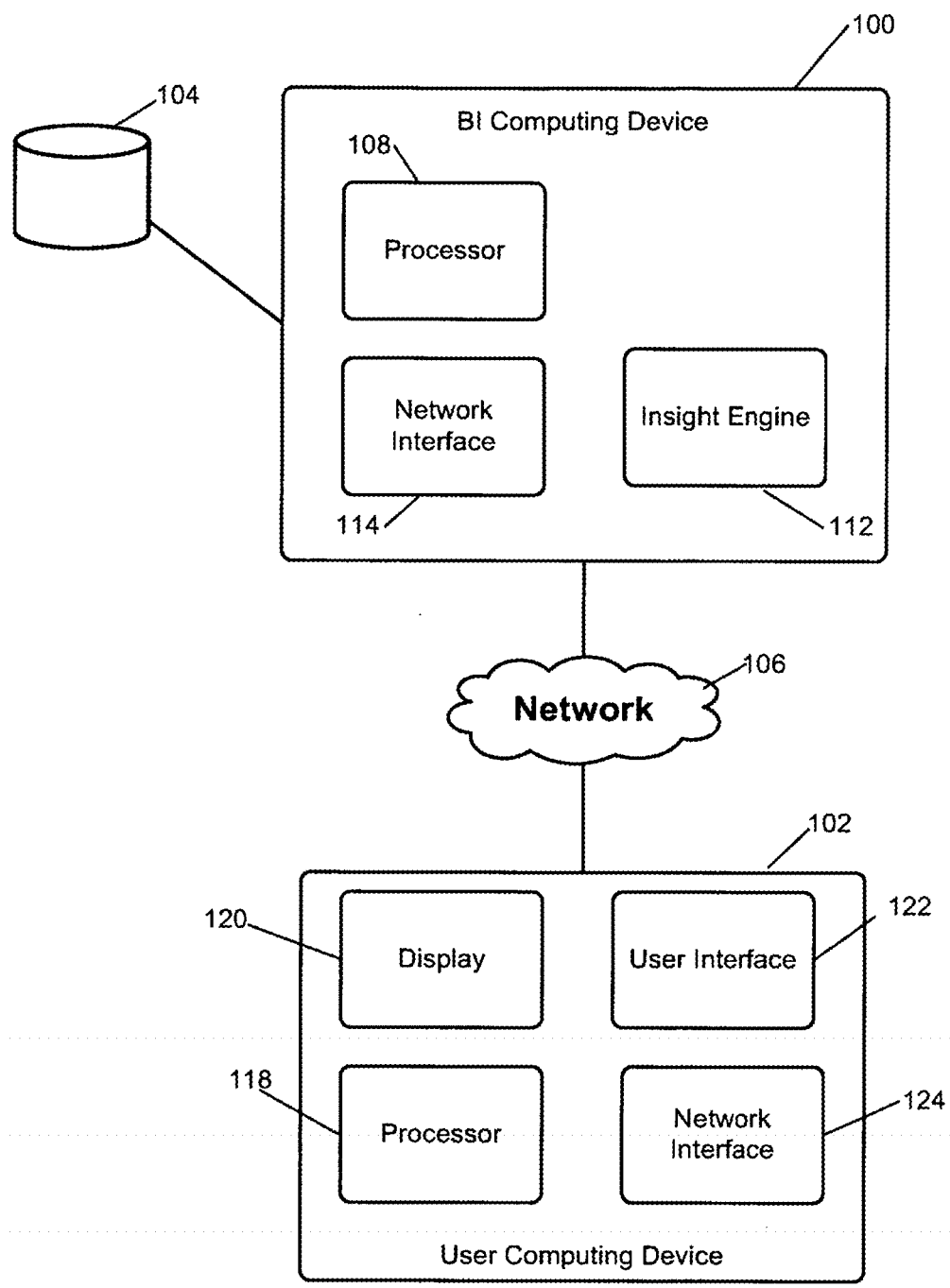
FIG. 1 is a block diagram of one embodiment of a system for automatically identifying insights from a dataset and presenting the insights ranked by importance.

Concepts and technologies are described herein for an automated mechanism that analyzes complex multi-dimensional data to identify significant insights of subspaces within one or more datasets of the multi-dimensional data.

Overview

A user operating an example computing device identifies a data set of one or more subspaces. The data is taken from previously defined multi-dimensional data. The computing device identifies attributes of the subspaces, then determines if an attribute of a subspace differs from an attribute of other subspaces by a threshold amount. Insights are identified for those subspaces that are determined to differ by the threshold amount. The insights include two or more different types. The computing device orders the identified insights based on various comparisons between the insights. Then, the computing device presents a portion of the insights based at least on the ordering.

The different types of insight may be a numerical insight having a value, a time-based insight having a time component or a compound insight having insights based on two or more subspaces.

The computing device orders by scoring a portion of the insights and ranking the scored insights. The computing device scores by determining an impact value for the insights based at least on a market share rating of the associated subspaces. The market share rating is based on a relevance of the subspace associated with the insight to other comparable subspaces. Then, the computing device determines a significance value of the individual one of the insights, normalizes at least one of the impact value or significance value to the range [0, 1] and determines the score for the individual one of the insights based at least on the impact value and the significance value.

The following detailed description refers to the accompanying drawings. Wherever possible, the same reference numbers are used in the drawing and the following description to refer to the same or similar elements. While example implementations may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Referring now to the drawings, in which like numerals represent like elements, various embodiments will be described. FIG. 1 is a block diagram illustrating an example system architecture with components for automatically identifying insights from a dataset and presenting the insights ranked by importance. The system architecture includes a business intelligence (BI) computing device 100 and a user computing device 102. The BI computing device 100 may be one of a variety of suitable computing devices described below with reference to FIG. 5. For example, the BI computing device 100 or the user computing device 102 may include a tablet computing device, a desktop computer, a mobile communication device, a laptop computer, a laptop/tablet hybrid computing device, a gaming device, or other type of computing device for performing a variety of tasks.

The BI computing device 100 may include a processor 108, a network interface 114 and an insight engine 112. A data store 104 includes one or more multi-dimensional data structures. The data store 104 may be directly connected to the BI computing device 100 or may be connected via a network 106 or another network to the BI computing device 100. The user computing device 102 may include a processor 118, a display device 120, a user interface 122 and a network interface 124. The network interfaces 114, 124 allow the respective computing devices to communicate with other computing devices over the network 106, such as a public or private data network. A user of the user computing device 102 may request access to a multi-dimensional data structure stored in the data store 104. This request may be in the form of interaction with a webpage produced by the processor 108 via the network interface 114. The processor 108 upon execution of the insight engine 112 performs insight analysis of one or more datasets of the requested multi-dimensional data structure or other unrequested multi-dimensional data structures. Upon completion of the insight analysis, one or more insights may be presented via the display 120 to the user at the time soon after the user making the request via the user interface 122. Insight analysis is described in detail below.

Multi-dimensional data allows for various types of analysis tasks such as BI analysis. Table 1 shows an example of a multi-dimensional dataset about car sales.

TABLE 1

| Year | Quarter | Brand | Model | Market | Sales | Profit |
|---|---|---|---|---|---|---|
| 2008 | Q1 | Ford | SUV | USA | 110,798 | 5,460 |
| 2008 | Q2 | Ford | SUV | USA | 88,548 | 3,875 |
| 2008 | Q3 | Ford | SUV | USA | 118,637 | 5,900 |
| 2008 | Q4 | Ford | SUV | USA | 147,569 | 6,490 |
| 2009 | Q1 | Honda | Midsize | China | 51,040 | 2,200 |
| 2009 | Q2 | Honda | Midsize | China | 35,789 | 1,870 |
| 2009 | Q3 | Honda | Midsize | China | 68,453 | 3,100 |
| 2009 | Q4 | Honda | Midsize | China | 79,322 | 3,980 |
| ... | ... | ... | ... | ... | ... | ... |

Multi-dimensional data is conceptually organized in a tabular format (i.e., multi-dimensional table) that includes a set of records as rows in the table, and each record is represented by a set of properties as columns in the table.

The multi-dimensional data includes two types of columns—dimension and measure. Dimension column and measure column are mutually exclusive, which means a column in a multi-dimensional table will be either a dimension or a measure but not both.

Dimensions represent basic and intrinsic properties of records in the table, e.g., "Brand" and "Year" for the car sales dataset. Dimensions are used to group and filter the records, based on equality and inequality of the dimension values. Dimensions fall into two major types according to their value domains—categorical and ordinal. Specifically, a categorical dimension takes categorical values (e.g., "Brand" for car sales), while an ordinal dimension takes ordinal values (e.g., "Year" for car sales).

Categorical and ordinal are used to categorize dimensions mainly for characterizing their intrinsic ability to reflect ordering, but not to limit their usage scenarios. There may be ordinal dimensions with non-numerical values (e.g., an "Age" dimension could also take "Infants", "Children", "Teens", and etc. as values). When ordering is not an important aspect in the analysis task, ordinal dimensions may be used just as categorical dimensions.

For records, measures reflect attached and quantitative properties that are related to the analysis task (e.g., "Sales" and "Profit" for the car sales dataset). The values in measure columns are typically numerical values.

For a dataset, subspace is a concept representing a subset of records. Specifically, a subspace is defined by a set of <dimension: value> pairs as filtering constraint, and the subspace contains exactly all the records that satisfy the filtering constraint in the given dataset. For a given dataset, there is a special subspace with no filtering constrain in its definition, denoted as the * subspace that includes all the records in the given dataset.

The following describes different relationships of subspaces.

When subspace A's definition is subset of subspace B's definition differing in only one pair of <dimension: value> filter, A and B are in a parent-child relationship—A is a parent subspace of B and B is a child subspace of A, regarding the only dimension that is present in B's definition but absent in A's definition.

Parent-child relationship of subspaces infers the following properties:
  When B is a child subspace of A, B's records will be subset of A's records.
  The number of B's parent subspaces equals to the number of <dimension: value> filtering pairs in B's definition.
  When subspace A and B have the same number of <dimension: value> filtering pairs and only differ in one filtering pair by the same dimension but different values, A and B are in a sibling relationship.

Furthermore, given a dataset, all the subspaces that share the same parent subspace form a sibling group of subspaces.

Sibling relationship and sibling group of subspaces infer the following properties:
  When A and B are sibling subspaces, their intersection of records will be empty.
  The union of the records in all the subspaces in a sibling group will equal to exactly all the records in their shared parent subspace.

Knowledge and insight are based on quantitative characteristics of data subsets. In addition to subspace definition, which characterizes the subspace by reflecting the commonness of the data records in it regarding dimension values, the subspace can also be characterized using attributes that are derived based on measures. Direct aggregation on some measure for a subspace may be an attribute, e.g., the SUM aggregate on the "Sales" measure for the {Brand: Ford Market: China} subspace is an attribute reflecting the total sales of Ford cars in China. Derived calculation based on measure aggregation could also be an attribute, e.g., the ranking position of sales SUM for the subspace {Brand: Ford Market: China} comparing with its sibling subspaces regarding other "Brand"s, or the trend of sales SUM for the subspace {Brand: Ford Market: China} over "Year"s (based on the sales SUM results for {Brand: Ford Market: China, Year: 2008}, and etc. respectively).

The preceding example illustrates the fact that attributes can be piped—the result of one attribute calculation can be the input of another attribute calculation and iteratively forms an attribute pipeline with meaningful semantics. Table 2 lists example attributes that can be used to form various attribute pipelines. For example, $Sum_{Sales}$ piped with $DiffFromPrev_{Year}$ piped with $Rank_{Brand}$ for the subspace {Brand: Ford, Year: 2009} corresponds to the ranking position of "Ford" across all "Brand"s regarding "Sales" increase of the "Year" 2009; while the same three attributes in different pipeline order corresponds to different semantics –$Sum_{Sales}$ piped with $Rank_{Brand}$ piped with $DiffFromPrev_{Year}$ corresponds to the "Sales" ranking position change of "Ford" in the "Year" 2009 across all "Brand"s. More such pipelined attributes can be added.

TABLE 2

| Type | Category | Notation | Description | Remark |
|---|---|---|---|---|
| Raw attribute (taking records in the subspace S as input) | Aggregation | $Sum_m(S)$ | Sum on measure m | |
| | | $Avg_m(S)$ | Average on measure m | |
| | | $Max_m(S)$ | Max of measure m | |
| | | $Min_m(S)$ | Min of measure m | |
| | | $Cnt(S)$ | Count of records | |
| | | $Cnt_m(S)$ | Count of distinct values of measure m | |
| | | $Cnt_d(S)$ | Count of distinct values of dimension d | |
| Derived point-attribute (taking raw attributes or derived point-attributes of S and other corresponding subspaces as input) | Accumulation | $RunningSum_d(S)$ | Accumulative sum of S and S's predecessor sibling subspaces regarding dimension d | d is a temporal dimension |
| | | $Running\ Avg_d(S)$ | Accumulative average of S and S's predecessor sibling subspaces regarding dimension d | |
| | Difference | $DiffFromAvg_d(S)$ | Difference between S and the average over S's sibling group regarding dimension d | |
| | | $DiffFromMin_d(S)$ | Difference between S and the minimum of S's sibling group regarding dimension d | |
| | | $DiffFromMax_d(S)$ | Difference between S and the maximum of S's sibling group regarding dimension d | |
| | | $DiffFromPrev_d(S)$ | Difference between S and S's predecessor sibling subspace regarding dimension d | d is a temporal dimension |
| | | $DiffFromFirst_d(S)$ | Difference between S and the first subspace of S's sibling group regarding dimension d | |

TABLE 2-continued

| Type | Category | Notation | Description | Remark |
|---|---|---|---|---|
| | | DiffFromLast$_d$(S) | Difference between S and the last subspace of S's sibling group regarding dimension d | |
| | Positioning | Rank$_d$(S) | Ranking position of S in S's sibling group regarding dimension d | |
| | | Percentage$_d$(S) | Percentage of S against S's sibling group regarding dimension d | The input attribute is additive and non-negative |
| Derived shape-attribute (taking raw attributes or derived point-attributes of S and other corresponding subspaces as input) | Time series | TimeSeries$_d$(S) | The time series formed by S breaking down by dimension d | d is a temporal dimension outside S's definition |

So based on the preceding discussion about multi-dimensional data, attributes and attribute pipeline, an example insight definition is as follows:

Definition 1 Basic insight—given a multi-dimensional dataset as analysis context, a basic insight is a fact of Single insight—a subspace with an significantly uncommon value (based on a threshold value/setting) of attribute compared to its sibling subspaces or parent subspaces;

Compound insight—a significantly uncommon relationship among some subspaces.

The relationship of two subspaces may be characterized by their subspace relationship together with the relationships between their attributes. For example, the subspaces {Brand: Ford} and {Brand: Ford Market: China} are in the parent-child subspace relationship, when their "Sales" trends (TimeSeries attribute) over "Year"s have a significant positive correlation relationship, the two subspaces and such uncommon relationships can form an insight.

So a basic insight may include the following three components.

One (for single insight) or a number [>1] of subspaces (for compound insight) as subjects of the insight;

A calculation in the form of an attribute or an attribute-pipeline as the perspective to characterize the subject(s) and (for compound insight) their relationship;

An insight type as the perspective from which the calculation result is uncommon, and the corresponding score reflecting both the importance of its subject(s) and the uncommonness of its calculation result.

Table 3 provides example insight categories and types.

TABLE 3

| Insight category | Insight type | Description |
|---|---|---|
| Single insight based on raw attribute or derived point-attribute | Outstanding No. 1 | Among a comparison group with non-negative aggregation results, Outstanding #1 shows the fact that the leading value is remarkably higher than all the remaining values. (But not as high as being dominant, introduced later with Attribution) |
| | Outstanding No. last | Similar to Outstanding No. 1, it is for negative aggregation results and shows the fact that the most negative value is remarkably lower than all the remaining values. |
| | Outstanding top 2 | Similar to Attribution, it shows the fact that the leading two values are remarkably higher than the remaining values, and they dominate the group together. |
| Single insight based on derived shape-attribute | Trend | A time series has an obvious trend (increase/decrease) with a certain turbulence level (steadily/with turbulence). |
| | Seasonality | A time series shows clear seasonality. |
| | Outlier | Within a time series, a point is an outlier. |
| | Change point | Within a time series, a point is a change point regarding different shapes of its preceding and successive parts. |

TABLE 3-continued

| Insight category | Insight type | Description |
| --- | --- | --- |
| Compound insight | Correlation | Two time series have remarkable positive/negative correlation with a certain leading/lagging time offset. |
| | Attribution | Among a comparison group, Attribution shows the fact that the leading value dominates the aggregate of the group. |

Regarding an insight candidate (i.e., an insight not ready to be outputted to user), as an example implementation, the score is a combination of the following two factors:

Impact—it reflects the importance of the subject subspace(s) of the insight against the entire dataset. Such impact can be determined by the best possible perspective for promoting the subspaces regarding any measures and calculations and their combinations. The intuition is as follows—when considering an insight about subspace A, the ranking of the insight should be higher when A is more important, and A's importance should be determined by the best possible perspective to promote;

Significance—it reflects purely the significance of the insight itself.

The Impact and Significance are normalized for fairness of comparison. For example, when both Impact and Significance are normalized in the [0,1] interval, their direct product is used as the score of the insight for ranking. Other methods of combining Impact and Significance may be used to calculate a score. Table 4 shows examples of significance value calculations for the different insight types.

TABLE 4

| Insight type | Description | Significance |
| --- | --- | --- |
| Outstanding No. 1 | Among a comparison group with non-negative aggregation results, Outstanding No. 1 shows the fact that the leading value is remarkably higher than all the remaining values. (But not as high as being dominant, which will be introduced later with Attribution) | Given a group of non-negative numerical values $\{x\}$ and their biggest value $x_{max}$, the significance of $x_{max}$ being Outstanding No. 1 of $\{x\}$ is defined based on the p-value against the null hypothesis of $\{x\}$ obeys an ordinary long-tail distribution. The p-value will be calculated as follows:<br>1. sort $\{x\}$ in descending order;<br>2. assume the long-tail shape obeys a poer-law function. Then, regression analysis is conducted for the values in $\{x\}\setminus x_{max}$ using power-law functions $\alpha i^{-\beta}$, where i is an order index;<br>3. assume the regression residuals obey a Gaussian distribution. Then, the residuals in the preceding regression analysis are used to train a Gaussian model H;<br>4. use the regression model to predict $x_{max}$ and get the corresponding residual R;<br>5. The p-value will calculated via P(R\|H). |
| Outstanding No. last | Similar to Outstanding No. 1, it is for negative aggregation results and shows the fact that the most negative value is remarkably lower than all the remaining values. | As a mirror of Outstanding No. 1 |
| Attribution | Among a comparison group with non-negative aggregation results, Attribution shows the fact that the leading value dominates (accounting for >= 50% market share of) the group. | Subspace S and one of its child subspaces S' form an Attribution insight regarding a certain measure when the market share of S is dominated by S'. The significance of S and S' forming an Attribution insight is defined based on such dominancy. And currently the dominancy is straightforwardly translated as $\frac{S'}{S} \times 100\% \geq 50\%$ while the significance is calculated with a Sigmoid function $$\frac{1}{1+e^{-\lambda\left(\frac{S'}{S}-\mu\right)}},$$ where $\mu = 0.5$ and $\lambda = 100$ in our current implementation. |

TABLE 4-continued

| Insight type | Description | Significance |
|---|---|---|
| Trend | A time series has an obvious trend (increase/decrease) with a certain turbulence level (steadily/with turbulence). | For a time series X, currently the Trend insight is defined for an interval $X_i$ between two successive change points (including the start and end points) of X to reflect a relatively sustained trend of $X_i$. And the significance of $X_i$'s trend is defined based on the following three factors.<br>1. SlopeSignificance - it reflects the extend of how fast the trend increases/decreases. Here a Sigmoid function is used $$\frac{1}{1+e^{-\lambda(\text{Math.Abs(average slope of Xi)}-\mu)}},$$ where $\mu = 0.15$ and $\lambda = 50$ in our current implementation.<br>2. SteadinessSignificance - it reflects the extend of how steadily the trend moves. Here a Sigmoid function is used $$\frac{1}{1+e^{-\lambda\left(\frac{\text{Mean Square Root of Xi's residule}}{\text{regarding trend}}-\mu\right)}},$$ where $\mu = 0.10$ and $\lambda = 50$ in our current implementation.<br>3. ConsistencySignificance - it reflects the extend of how consistent the trend keeps increasing/decreasing. Here a Sigmoid funcation is used $$\frac{1}{1+e^{-\lambda(\text{Ratio of number of increasing or decrasing segments}-\mu)}},$$ where $\mu = 0.667$ and $\lambda = 50$ in our current implementation.<br>4. The significance of X having remarkable trend is defined based on the product of the three factors above. |
| Seasonality | A time series shows clear seasonality. | The significance of a time-series signal X being seasonal is defined based on the p-value of X's spectrum against the null hypothesis of X's spectrum representing a non-seasonal signal. The p-value will be calculated as follows:<br>1. We get X's frequency spectrum X' using FFT;<br>2. We have a known distribution H for the frequency spectrums of non-seasonal time-series signals:<br>3. the p-value will be calculated via $P(X'|H)$. |
| Correlation | Two times series have remarkable positive/negative correlation. | The significance of two time-series signals X and Y being correlated is defined based on the p-value of (X, Y)'s CCF (Cross Correlation Function) curve against the null hypothesis of (X, Y)'s CCF curve representing two non-correlated signals. The p-value will be calculated as follows:<br>1. We (X,Y)'s CFF curve Z using a conjugate product operator in their frequency domain after applying FFT;<br>2. We have a known distribution H for the CCF curves for non-correlated signals;<br>3. The p-value will be calculated via $P(Z'|H)$. |

TABLE 4-continued

| Insight type | Description | Significance |
| --- | --- | --- |
| Outstanding top 2 | Similar to Attribution and Outstanding No. 1, among a comparison group with non-negative aggregation results, Outstanding top 2 shows the fact that the leading two values are remarkably higher than the remaining values and jointly dominate the group. | Given a group of non-negative numerical values $\{x\}$ and their leading two values $x_0$ and $x_1$ $\{x_0 \geq x_1\}$, $(x_0, x_1)$ is defined as being Outstanding to 2 of $\{x\}$ when<br>1. $x_0$ is not Outstanding No. 1 of $\{x\}$;<br>2. $x_1$ is Outstanding No. 1 of $\{x\}\backslash x_0$<br>The significance of $(x_0, x_1)$ being Outstanding top 2 of $\{x\}$ is defined as being equal to the significance of $x_1$ being Outstanding No. 1 of $\{x\}\backslash x_0$. |
| Change point | Change point of time-series signals regarding significant change of (1) mean value or (2) curve slope or (3) their combination between its preceding and sucessive regions | A change point can be a mean-value change point or curve-slope change point or both. The corresponding significances are defined as follows, respectively. When a change point is both mean-value and curve-slope change point, it takes the higher significance value.<br>1. A change point candidate is evaluated agaiinst its left window of n preceding points and its right windows of n successive points, denoted as $\{X_{left}, Y_{left}\}$ and $\{X_{right}, Y_{right}\}$ respectively. The entire window surrounding the change point candidate is denoted as $\{X, Y\}$.<br>2. For mean-value change point<br>a. $$\hat{Y}_{left} = \frac{\sum y_{left}}{n}$$ $$\hat{Y}_{right} = \frac{\sum y_{right}}{n}$$<br>b. $$\sigma_{\mu y} = \frac{1}{\sqrt{n}}\sigma_y = \frac{1}{\sqrt{n}}\sqrt{\frac{\sum y^2}{2n} - \left(\frac{\sum y}{2n}\right)^2}$$<br>c. $$k_{mean} = \frac{|\overline{Y}_{left} - \overline{Y}_{right}|}{\sigma_{\mu y}}$$<br>and the significance is defined based on the p-value of $k_{mean}$ against Gaussian distribution $N(0, 1)$.<br>3. For curve-slope change point<br>a. Using Least Squares regression, intercept $\beta_{left,0}$, slope $\beta_{left,1}$ for $\{X_{left}, Y_{left}\}$, and square error are attained $\epsilon_{left}^2 = \Sigma(y_{left} - \beta_{left,0} - x_{left}\beta_{left,1})^2$, and the same for $\{X_{right}, Y_{right}\}$<br>b. $\Sigma(y_{left} - \beta_{left,0} - x_{left}\beta_{left,1})^2$, and similarly $\sigma_{right, slope}^2$<br>c. $$k_{slope} = \frac{|\beta_{left,1} - \beta_{right,1}|}{\sqrt{\sigma_{left,slope}^2 + \sigma_{right,slope}^2}}$$<br>and the significance is defined based on the p-value of $k_{slope}$ against Gaussian distribution $N(0, 1)$. |

TABLE 4-continued

| Insight type | Description | Significance |
| --- | --- | --- |
| Outliner | Outliner of time-series signals | A point is considered as an outlier of a time series when it deviates from the trend (low-frequency components) significantly further than (1) the majority of the points and (2) its neighbor points. The significance is defined as follows.<br>1. For a time-series signal X, its trend (low-frequency components) signal X' is determined<br>2. For each point of the time-series signal, its redial regarding the trend is denoted as R = X - X'<br>3. The significance of a point x being outlier is defined based on the p-value of R(x) against Gaussian distribution $N(R_{median}, 3R_{median})$ |

Extensible Search Framework for Insight Mining

Conceptually, a search framework enumerates and evaluates insight candidates regarding the three components of insight definition—subspace, insight type, and calculation. In practice, the insight candidate to be evaluated can be enumerated by the search framework in an alternative form of context with the following hierarchical logic:

The search framework enumerates subject subspaces in the top hierarchy;

Each single subspace will be used as the subject of single insights to be evaluated;

Each set of subspaces in parent-child or sibling (as in an example implementation) or other relationships will be used as the subjects of compound insights to be evaluated.

The search framework enumerates calculations in the second hierarchy.

A calculation for a subject subspace or a set of subject subspaces can be either A raw attribute—measures/dimensions are enumerated for the raw attribute calculation; or An attribute pipeline—attributes in the pipeline and the dimensions/measures for the calculation of each of the attribute in the pipeline are enumerated.

For each context of subject subspace(s) plus calculation from the second hierarchy, the search framework enumerates insight types to be evaluated in the third hierarchy.

In short, the search framework enumerates 3-tuples <subject subspace(s), calculation, insight type> in three hierarchies, and each specific combination by a 3-tuple determines a specific insight candidate to be evaluated. In this section, this provides an extensible design of the search framework regarding the search for 3-tuples, and leaves the search prioritization and result ranking to later sections. Extensible means that it can support new insight types.

Isolation of Computing Task Units

Isolation of computing functions (i.e., task units) is performed so that adding new insight types can introduce minimum impact on the framework. In one implementation the following three kinds of computing task units are defined separately.

Subspace search unit—it corresponds to the top-hierarchy enumeration for enumerating subject subspaces.

Calculation search unit—it corresponds to the second-hierarchy enumeration for enumerating calculations.

Insight evaluation unit—it corresponds to the third-hierarchy enumeration for enumerating insight types.

This way, the impact of adding new insight types will be restricted within the third-hierarchy insight evaluation unit, and the impact of adding new attribute types for new calculations will be restricted within the second-hierarchy calculation search unit.

Abstraction for Insight Evaluation Units

Abstraction enables adding new insight types to leverage the existing framework as much as possible. In some examples, insight evaluation units are classified into the following three categories according to the corresponding insight types, so that new insight types are likely to fall into these three categories and be easily supported by the framework.

Single point insight evaluation unit—it corresponds to the insight types about a single subspace as the single subject, and a calculation based on a raw attribute or an attribute pipeline ended with a derived point-attribute.

Single shape insight evaluation unit—it corresponds to the insight types about a single subspace as the single subject, and a calculation based on an attribute pipeline ended with a derived shape-attribute.

Compound insight evaluation unit—it corresponds to the insight types about two or more subspaces.

New insight types fall into one of the above three categories, and the corresponding computing task framework is leveraged for easy supporting to the new insight type.

Ranking

Once each insight has a score, the insights are ranked according to the descending order of their corresponding scores, no matter type-wise or not. The score has two factors according to the following facts:

The following two major components of an insight are relevant for insight scoring.

A subspace or two subspaces (as in an example implementation) or a number [>2] of subspaces as the subject(s) of the insight An insight type and its statistical measure (significance) reflecting the extent of extremeness/uncommonness of the insight The intuitions behind insight ranking principles are as follows:

Preference is separated across insight types, e.g., by ranking insights type-by-type or ignoring types. When the significance values of two insights are comparable, the insight whose subject(s) are more important goes first.

When the importance of two insights' subjects are comparable, the insight with higher significance value goes first.

In general, one, two or a larger number of subspaces are promoted using impact—the importance of a set of records against all the records of the given dataset. For conciseness of discussion without losing generality, take the impact of one subspace as an example, and the conclusions become applicable and extensible to multiple-subspace cases.

A subspace is evaluated from multiple perspectives. The most advantaged perspective is taken for promotion. The following are multiple possible perspectives for impact evaluation.

1. Each measure column provides a potential kind of weighting information for evaluating importance of a record and then of a subspace against the entire dataset.
2. When each record corresponds to a peer entity such as a person, a sales record, or a basic event log, an additional imaginary measure column (i.e., Count) with equivalent weight for each record is considered. The ratio of sum of such weights (equivalent to the number of records) is used to reflect the subspace importance.
3. An attribute pipeline is another kind of potential perspective for impact measurement.

Based on the preceding discussion and analysis, weight normalization is conducted across those various perspectives. "Normalization" means to make different promotion criteria of different perspectives comparable—advantages over different weighting perspectives should be fair to each other with no bias. Therefore, weighting calculations are selected or even carefully constructed for normalization.

As an example implementation, proportion of non-negative values is the most fundamental normalization method. Therefore, for all those non-negative measure columns, when their default aggregation is SUM, proportion-based impact for those measure columns can be calculated with natural normalization.

Breaking of the non-negative constrain may cause trouble for normalization. The most challenging part comes from the total weight of the entire dataset would be a counterbalanced result by positive and negative values together, which might be even zero and useless for normalization. Also, there might be >100% or <−100% ratios as weights, which would be bias against other perspectives and lead to unfairness.

Therefore, perspectives that break the non-negative constrain are not used when there may be better perspectives to use. As an example implementation, using the ratio of sum of top-K values is a variant of proportion-based weight, in particular for those measure columns with average (AVG) as default aggregation. In fact this is another kind of [0, 1] ratio to replace proportion.

After scores are calculated, before outputting any insights, the top ranked insights can be sent to the diversification step, or an alternate implementation to identify meta insights. A meta insight is an organized collection of basic insights that are relevant and will collectively convey higher level/more sophisticated knowledge, such as shown in the following examples.

Figure 2A:
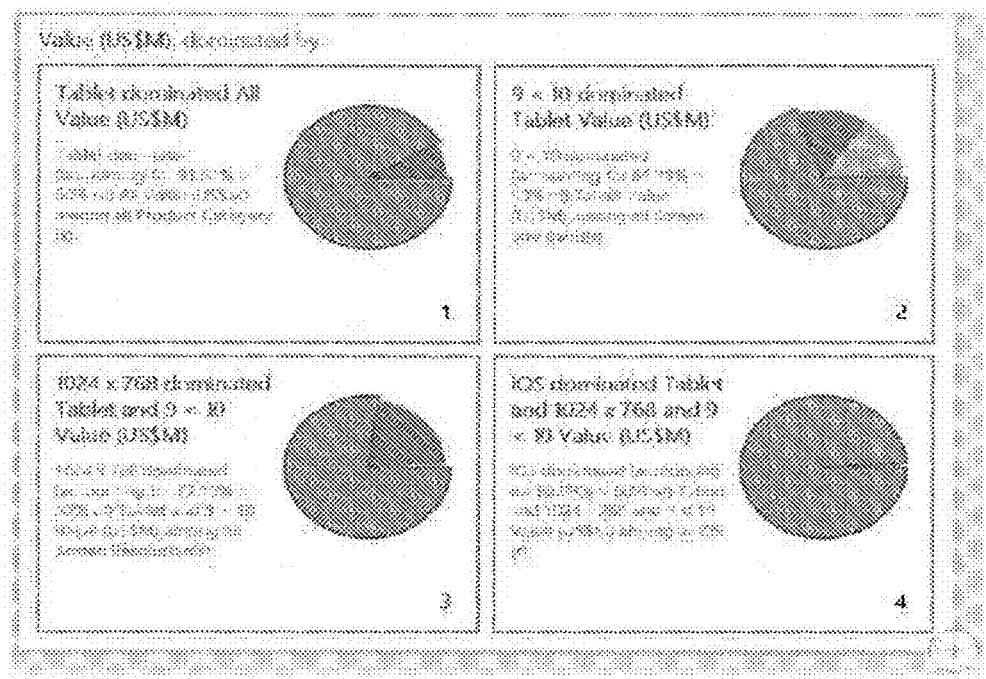
FIGS. 2A and 2B are example outputs of various meta insights.

FIG. 2A shows a meta insight based on four basic insights. Because the basic insights all relate to tablet sales, they uncover a dominance chain of Sales (measured by value in million US dollars) as follows:

1. Tablet dominates All (91.58%)
2. Size of 9-to-10 inches dominates Tablet of all sizes (69.79%)
3. Screen resolution of 1024×768 dominates Tablet of size 9-to-10 inches (77.15%)
4. iOs based Tablet dominates Tablet of size 9-to-10 inches and screen resolution of 1024×768 (99.09%)

From this meta insight a user may easily realize the driving factors of popular tablet sales.

Figure 2B:
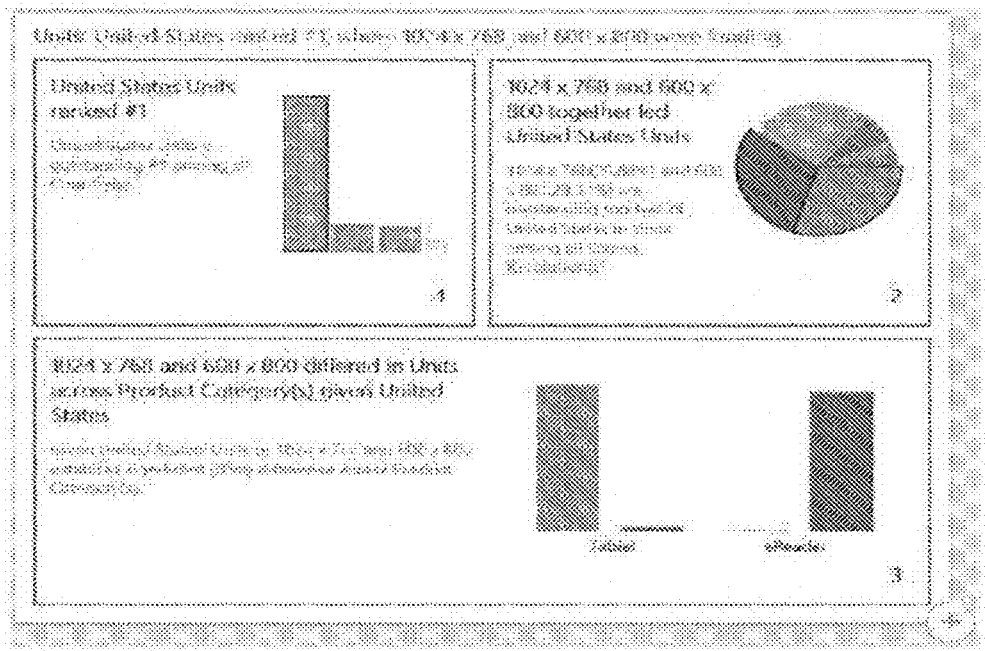

FIG. 2B shows a meta insight based on three basic insights that uncover comprehensive interesting facts as follows:

1. United States is the outstanding No. 1 across all countries regarding tablet sales in unites.
2. Regarding screen resolution, 1024×768 and 600×800 are outstanding top two that jointly dominate tablet sales in the United States.
3. Regarding the preceding two resolutions, their distribution over product categories are quite different—1024×768 is mainly for Tablet category while 800×600 is mainly for eReader category.

From this meta insight readers may easily realize the interesting fact about resolution difference between Tablet and eReader, and the related contextual information about United States and screen resolutions.

Meta insight mining includes an insight graph data structure, with each node attached with a basic insight, and each edge representing the connection between two basic insights that are attached to the ending nodes of the edge. Also, meta insight mining includes a template-based construction algorithm for insight graph construction. The templates relate to valid connections between two insight types. A scoring model generates a score for each path (from root to leaf) of the insight graph. A distance model measures distance between two paths of the insight graph. An insight path selection algorithm is based on the preceding scoring model and a distance model.

Efficiencies

In order to improve efficiency of the insight engine 112, the insight engine 112 may implement some actions. For example, the insight engine 112 may perform:

Prioritizing computing actions for the insight candidates that correspond to final top-ranked insights to make sure that they will be evaluated within a time limit, and will be evaluated as early as possible.

Pruning the computing actions for the insight candidates that correspond to final low-ranked insights to save computing resource, and prune as early as possible.

When estimating the priority of a computing action, the calculation of the impact value of its corresponding subspace(s) is performed while the calculation of the significance value of the insight is not performed. Computing actions are prioritized in a best-first fashion based on the impact of its corresponding subspace(s).

Pruning includes:

Minimum-impact threshold pruning—regarding a preset impact threshold as the minimum impact, when a subspace(s) insight has lower impact than the threshold, it may be pruned;

Dynamic top-k impact pruning—when impact and significance are both normalized in the [0,1] interval and are combined using their product, the final score of an insight will be no more than its impact. In order to output the final top-k insights, insights, whose impact values are less than a score of the dynamic rank-k insight in the result queue, can be dynamically pruned.

Redundant insight pruning—there are cases that two or multiple subspaces differ in their definitions but correspond to the same group of records. This happens when the values of some dimension are deterministic according to the values of some other dimensions. These are called redundant subspaces, and different insights with redundant subspaces as subjects respectively are considered as redundant insights. Thus, the redundant subspaces are pruned to avoid generating redundant insights and save computing resource.

Computing optimization technologies are also implemented to varying degrees. Some computing optimization technologies in high level as follows:

Optimal search ordering for subspace search units
Subspaces are evaluated in a bottom-up order. The bottom-up order refers to start the enumeration from the subspace corresponding to the full dataset, and iteratively add new dimensions and values to the subspace definition to enumerate higher-level subspaces;
Adding new dimensions for subspace enumeration will have different orders that may lead to different performance. Adding the dimensions with larger cardinalities lead to better performance in that larger cardinality implies finer breakdown of the current subspace and the impact-based pruning may take earlier chance to prune the resultant breakdown subspaces.
Preprocessing for detection of correlated measures—highly correlated measures lead to multiple insights for the identical subspace(s) with highly overlapped knowledge. By detecting such correlated measures in the preprocessing stage, computing resource for evaluating such redundant insights are saved.

Diversification

For better user perception on the resultant top-k insights, insight diversity is implemented. Evaluating insight quality only based on the scores of individual insights might lead to highly redundant knowledge recommended by the top-k insights. Therefore, an insight selection mechanisms is implemented as a post-processing action after or in conjunction with ranking. This may produce a more balanced trade-off between single-insight score and diversity.

The concept behind a desirable insight selection mechanism defines some certain potential function against insight group, and then comes up with effective and efficient algorithms seeking for optimal solutions towards maximum potential.

One example implementation of the above concept is described as follows. Starting from the potential function, for a given insight group $$G_k = \{I_i | 0 \le i \le k-1, k > 1\}$$

and a certain pairwise insight distance function $D(I_i, I_j)$, below is an appropriate potential function.

$$E(G_k) := AVG(\{D(I_i, I_j) | I_i, I_j \in G_k, i \ne j\}) = \frac{2}{k(k-1)} \sum_{0 \le i < j \le k-1} D(I_i, I_j)$$

The pairwise insight distance function $D(I_i, I_j)$ plays a key role in the potential function.

The following are factors of an insight:
T—Insight type
S—Subspace
C—Calculation
X—Insight score (monotonically increasing with insight significance and/or subspace impact)

The first three factors T, S, and C do count for discreminating insights and thus help with diversifying selected insights, while X does not but it helps with insight ranking. The following sub-models for insight distance regarding the first three factors are defined respectively, as building blocks for $D(I_i, I_j)$.

$D(I_i, I_j) := \delta(T_i, T_j)$ (Kronecker delta, i.e., 1 for equality and 0 for otherwise)

$$D_S(I_i, I_j) := \frac{b + c_i + c_j}{2a + 2b + c_i + c_j}$$

a is the number of shared identical <dimension: value> filters between the subspaces of $I_i$ and $I_j$
b is the number of filters with shared identical dimension but different value between the subspaces of $I_i$ and $I_j$
$c_i$ and $c_j$ are the numbers of unique <dimension: value> filters of the subspaces of $I_i$ and $I_j$, respectively $D_C(I_i, I_j) := \delta(C_i, C_j)$ Then, some combination of these sub-models, such as linear combination, is used to define $D(I_i, I_j)$ as follows, $D(I_i, I_j) := a_T D_T(I_i, I_j) + a_S D_S(I_i, I_j) + a_C D_C(I_i, I_j)$ where $a_T$, $a_S$, and $a_C$ are coefficients for the linear combination, and their values are determined by empirical tuning via experiments. In an example implementation, taking insight score X as reference weight 1.0, the three coefficients are set to $a_T = 2.0$, $a_S = 1.8$, and $a_C = 0.2$, respectively.

Finally, an effective and efficient algorithm is used to search for optimal solutions against the potential function. The setup of the optimization problem is as follows.

Input—an insight group G with all top N auto insights for each insight type, generated by our existing engine without this insight diversification effort
Output—$G_k$ with top-k auto insights having maximum potential $E(G_k)$ However, algorithms for true optimal solutions are too costly with high complexity. Therefore, light-weight algorithms using a greedy strategy is used.

1. $I^0 := \text{argmax}_j \{X(I_j) | I_j \in G\}$

2. $G_k^0 := \{I^0\}$

3. For $m := 1$ to $k-1$ do a. $I^m := \text{argmax}_j \left\{ X(I_j) + \frac{1}{m} \sum_{i=0}^{m-1} D(I^i, I_j) | I_j \in G \setminus G_k^{m-1} \right\}$ b. $G_k^m := G_k^{m-1} \cup \{I^m\}$ 4. $G_k := G_k^{k-1}$ In order to greedily select next insight, the following are example adjustments:

According to the $D_S(I_i, I_j)$ sub-model, a more-concrete subspace (with more filters) tends to have larger $D_S$ against more-general subspaces (with less filters). Thus concrete subspaces would have advantage from this perspective, which is not desirable. In practice, concrete subspaces are penalized by multiplying a factor $$\frac{1}{1+\lambda}$$

to the component $$\frac{1}{m} \sum_{i=0}^{m-1} D(I^i, I_j),$$

where λ is the number of filters of the most concrete subspace involved in this component.

In addition to X, bonus is granted for promoting insight types with preset preference. For example, the negative-correlation insight type for time-series data is relatively rare but with even higher interest. So for the preferred insight types, the corresponding insight is promoted by multiplying a factor η to the insight score X. In an example implementation, set η=2.0.

Table 5 provides examples that sum up the various implementations described above.

TABLE 5

| Insight category | Numerical | Time-based | Compound |
| --- | --- | --- | --- |
| Insight candidate | For subspace {Ford, SUV} and its attribute $Sum_{Sales}$, is it the Outstanding No. 1 of SUV regarding Brand(s)? | For subspace {Toyota, USA} and its attribute pipeline $Sum_{Sales} \rightarrow TimeSeries_{Year}$, does it show Seasonality regarding Year(s)? | For subspace {Ford, SUV} and its attribute $Sum_{Sales}$, does it dominate the sales of {Ford} regarding Model(s)? |
| Subject subspace(s) | {Ford, SUV} | {Toyota, USA} | {Ford, SUV} {Ford} |
| Calculation | $Sum_{Sales}$ | $Sum_{Sales}$ piped with $TimeSeries_{Year}$ | $Sum_{Sales}$ |
| Insight type | Outstanding No. 1 regarding dimension Brand | Seasonality regarding dimension Year | Attribution regarding dimension Model |
| Subspaces involved for evaluating the insight candidate | {Ford, SUV} {Toyota, SUV} {Honda, SUV} . . . | {Toyota, USA, 2007} {Toyota, USA, 2008} {Toyota, USA, 2009} . . . | {Ford, SUV} {Ford} |

Figure 3:
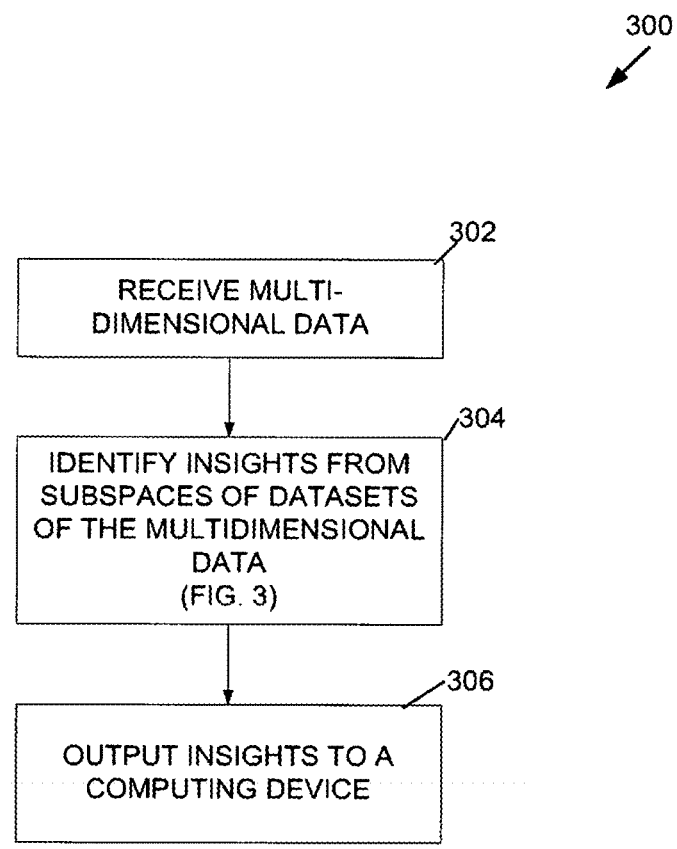
FIG. 3 is a flow chart of an example method for automatically identifying insights from a dataset and presenting the insights ranked by importance.
Figure 4A:
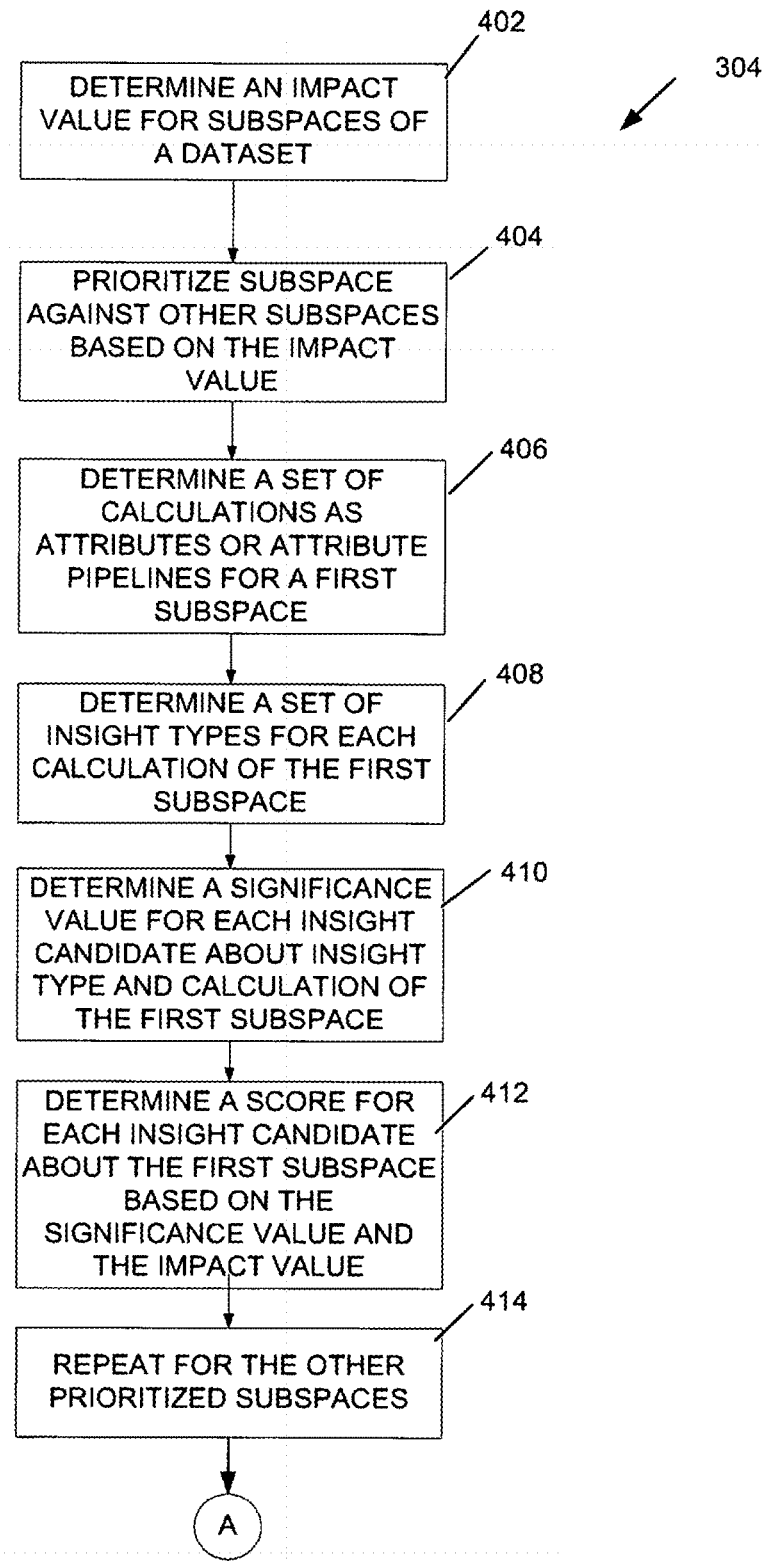
FIGS. 4A and 4B show a flow chart of an example method for identifying, scoring, ranking and diversifying insights.
Figure 4B:
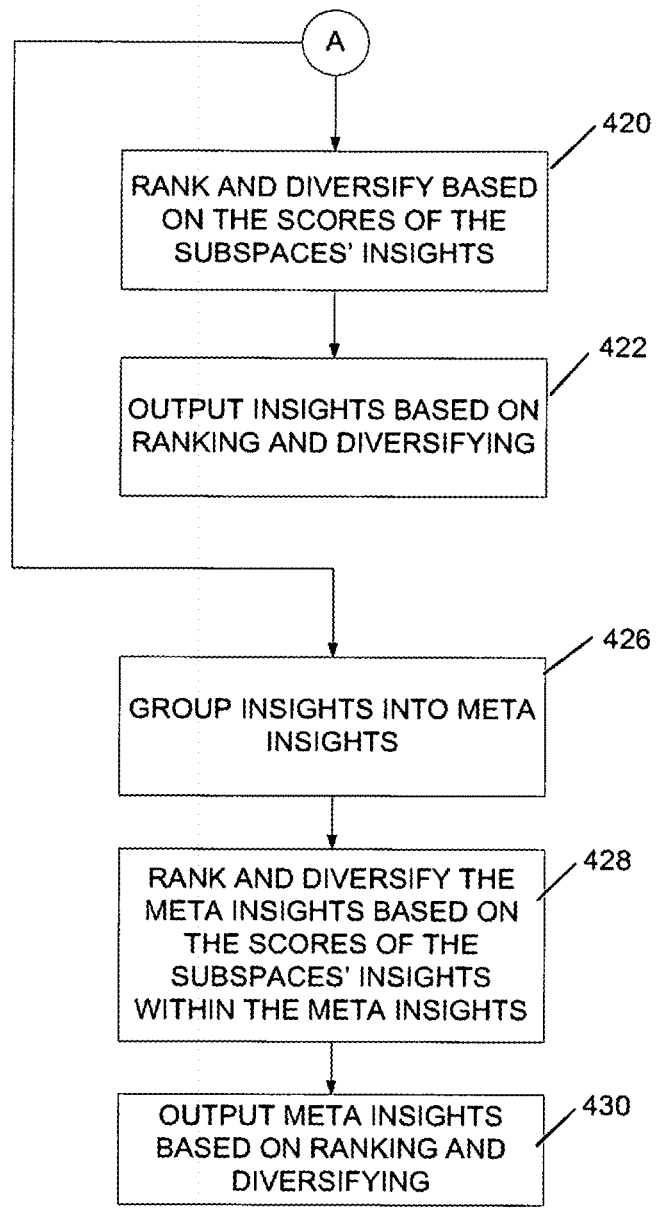

Turning now to the flowchart of FIGS. 3, 4A and 4B, aspects of insight generation for providing insight mined from a dataset(s) of multi-dimensional data are shown.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their entirety. Some or all operations of the methods, and/or substantially equivalent operations, can be performed by execution of computer-readable instructions included on a computer-storage media, as defined below. The term "computer-readable instructions," and variants thereof, as used in the description and claims, are used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices; acts, or modules. These operations, structural devices, acts, and modules may be implemented in software, in firmware, in special-purpose digital logic, and in any combination thereof.

As will be described in more detail below, in conjunction with FIG. 1, the operations of the routine 300 are described herein as being implemented, at least in part, by an application, component and/or circuit, such as the insight engine 112. Although the following illustration refers to the components of FIG. 1, it can be appreciated that the operations of the routine 300 may be also implemented in many other ways. For example, the routine 300 may be implemented, at least in part, by the processors 108, 118. In addition, one or more of the operations of the routine 300 may alternatively or additionally be implemented, at least in part, by a chipset working alone or in conjunction with other software modules. Any service, circuit, or application suitable for providing contextual data indicating the position or state of any device may be used in operations described herein.

With reference to FIG. 3, aspects of the routine 300 for identifying insights are shown. First, at operation 302, multi-dimensional data is received from a source or accessed by the insight engine 112 when implemented by the processor 108. The multi-dimensional data may be received from various different sources or data stores located proximate to BI computing device 100 (directly connected) or remote from BI computing device 100 (via a network connection). The multi-dimensional data that is received or accessed is based on a selection by a user as received from user computing device 102.

At operation 304, insights from subspaces of a dataset(s) of the multi-dimensional data are identified by the insight engine 112. This operation is described in more detail in the flow chart shown in FIGS. 4A and 4B.

At operation 306, indentified insights are outputted to the user computing device 102. Outputting insights may be performed various ways. An example includes outputting insights in real-time or near real-time from when the user selects and receives a dataset(s) included in the multi-dimensional data. The result provides the user with insights of the dataset(s), thus helping the user to analyze the multi-dimensional data presented to the user.

As shown in FIGS. 4A and 4B, operation 304 may begin at an operation 402, whereby impact values for different subspaces of a dataset are determined. The impact value as described above may be considered a comparison to an aggregate of comparable subspaces. For example, the impact value may be considered a share of the market with regard to like subspaces.

Next, at an operation 404, subspaces are prioritized based on the determined impact values for the subspaces. Operation 404 determines which subspaces should be further investigated. Due to a high volume of subspaces that may exist in a dataset, operation 404 may identify, by prioritization, those subspaces having low impact values. Those subspaces with low impact values (below a threshold) may be considered as not exhibiting enough impact to ever make a valuable insight. Thus, those subspaces below a certain impact threshold (i.e., priority) can be ignored in favor of higher priority subspaces.

At an operation 406, those subspaces above a threshold priority have a set of calculations in the form of an attribute or an attribute pipeline determined for each. In one implementation, insight engine 112 determines the calculations according to a pre-defined set of attributes and attribute pipelines for the subspaces.

Next, at an operation 408, valid types of insight is determined for each or the subspaces. Insight types are described above in Table 4. Insight type determination is based on the determined calculations of the respective subspace.

At an operation 410, insight engine 112 may determine a significance value for each insight candidate about insight type and calculation of the subspaces. Examples of significance value determinations are shown Table 4.

At an operation 412, insight scores for each of the insight candidates are determined based on the corresponding significance value and impact value. In one implementation, a product of the significance value and impact value produce the insight score. Other functions using significance values and impact values may be executed for producing a score.

At an operation 414, other ones of the prioritized subspaces have impact scores determined according to the operation 406-412.

After insight scores have been determined two different operational paths may be executed by themselves or in combination. In a first path, at an operation 420, ranking and diversifying of the subspace insights are performed based on the determined insight scores. The result of this operation may be presented on the user computing device 102 in any of a number of different formats, see operation 422.

In a second path, insights are grouped to form meta insights, see operation 426. At an operation 428, meta insights are ranked and diversified based on the scores of the subspaces of insights included within a meta insight. Then, at operation 430, the meta insights are outputted to a user computing device 102.

Figure 5:
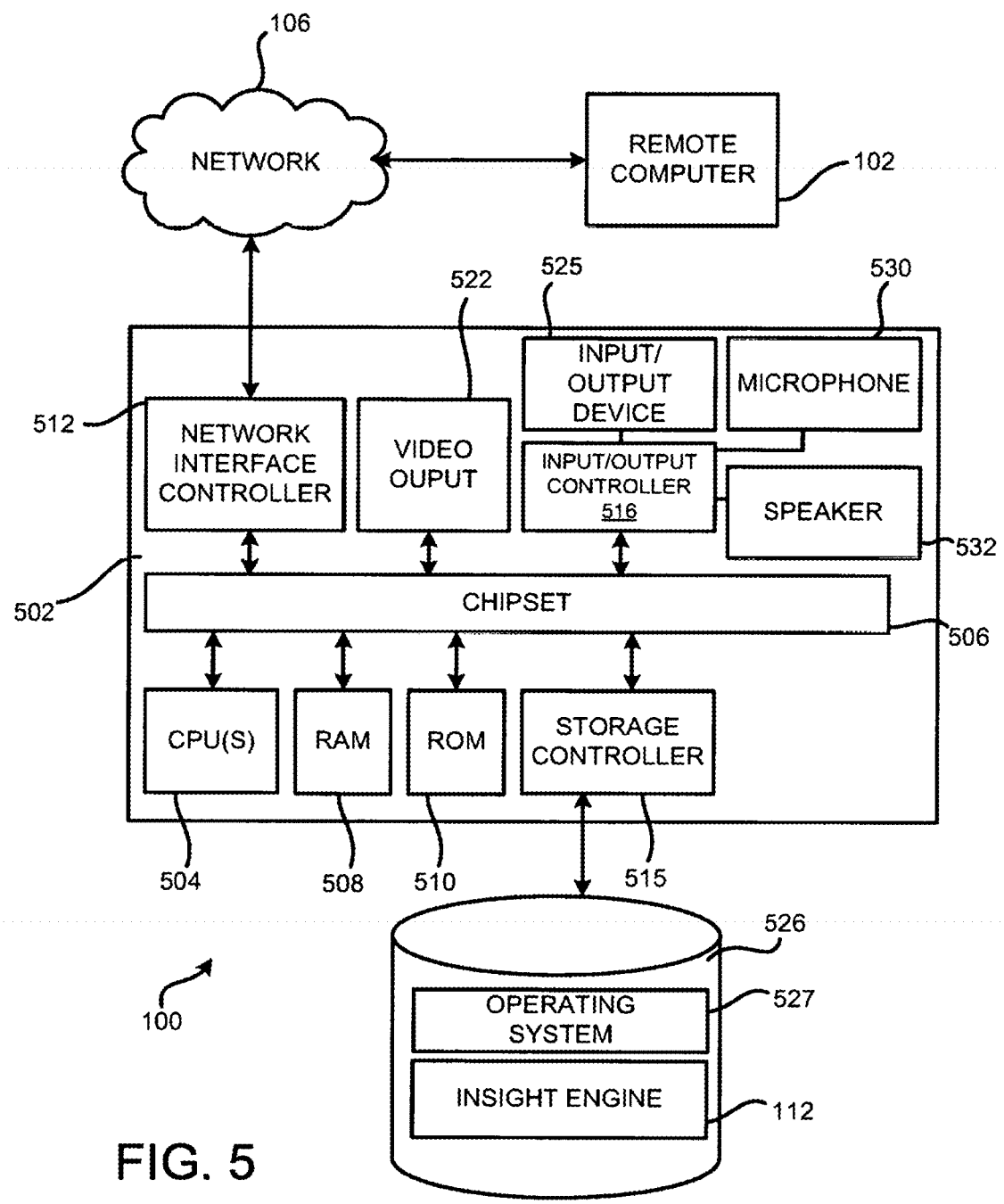
FIG. 5 is a block diagram of an example business intelligent computing device and remote user computing device, which implement the operations shown in FIGS. 3, 4A and 4B.

FIG. 5 shows additional details of an example computer architecture, for the components shown in FIG. 1, capable of executing the program components described above for providing action orchestration for servicing computing entities within complex fault domains. The computer architecture shown in FIG. 5 illustrates a console, conventional server computer, workstation, desktop computer, laptop, tablet, phablet, network appliance, personal digital assistant (PDA), e-reader, digital cellular phone, or other computing device, and may be utilized to execute any of the software components presented herein. For example, the computer architecture shown in FIG. 5 may be utilized to execute any of the software components described above. Although some of the components described herein are specific to the computing device 104, it can be appreciated that such components, and other components, may be part of the remote computer 102.

The computing device 104 includes a baseboard 502, or "motherboard," which is a printed circuit board to which a multitude of components or devices may be connected by way of a system bus or other electrical communication paths. In one illustrative embodiment, one or more central processing units (CPUs) 504 operate in conjunction with a chipset 506. The CPUs 504 may be standard programmable processors that perform arithmetic and logical operations necessary for the operation of the computing device 104.

The CPUs 504 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state, based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 may provide an interface to a RAM 508, used as the main memory in the computing device 104. The chipset 506 may further provide an interface to a computer-readable storage medium, such as a read-only memory (ROM) 510 or nonvolatile RAM (NVRAM) for storing basic routines that help to start up the computing device 104 and to transfer information between the various components and devices. The ROM 510 or NVRAM may also store other software components necessary for the operation of the computing device 104 in accordance with the embodiments described herein.

The computing device 104 may operate in a networked environment using logical connections to remote computing devices and computer systems through a network, such as the local area network 106. The chipset 506 may include functionality for providing network connectivity through a network interface controller (NIC) 512, such as a gigabit Ethernet adapter. The NIC 512 is capable of connecting the computing device 104 to other computing devices over the network 106. It should be appreciated that multiple NICs 512 may be present in the computing device 104, connecting the computer to other types of networks and remote computer systems. The network 106 allows the computing device 104 to communicate with remote services and servers, such as the remote computer 102. In addition, as described above, the remote computer 102 may mirror and reflect data stored on the computing device 104 and host services that may provide data or processing for the techniques described herein.

The computing device 104 may be connected to a mass storage device 526 that provides nonvolatile storage for the computing device 104. The mass storage device 526 may store system programs, application programs, other program modules, and data, which have been described in greater detail herein. The mass storage device 526 may be connected to the computing device 104 through a storage controller 515, connected to the chipset 506. The mass storage device 526 may consist of one or more physical storage units. The storage controller 515 may interface with the physical storage units through a serial attached SCSI (SAS) interface, a serial advanced technology attachment (SATA) interface, a fiber channel (FC) interface, or other type of interface for physically connecting and transferring data between computers and physical storage units. It should also be appreciated that the mass storage device 526, other storage media, and the storage controller 515 may include MultiMediaCard (MMC) components, eMMC components, secure digital (SD) components, PCI Express components, or the like.

The computing device 104 may store data on the mass storage device 526 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 526 is characterized as primary or secondary storage, and the like.

For example, the computing device 104 may store information at the mass storage device 526 by issuing instructions through the storage controller 515 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 104 may further read information from the mass storage device 526 by detecting the physical states or characteristics of one or more particular locations within the physical storage units.

In addition to the mass storage device 526 described above, the computing device 104 may have access to other computer-readable media to store and retrieve information, such as program modules, data structures, or other data. Thus, although the orchestration module 114, the service relationship data 112, and other modules are depicted as data and software stored in the mass storage device 526, it should be appreciated that these components and/or other modules may be stored, at least in part, in other computer-readable storage media of the computing device 104. Although the description of computer-readable media contained herein refers to a mass storage device, such as a solid-state drive, a hard disk, or CD-ROM drive, it should be appreciated by those skilled in the art that computer-readable media can be any available computer storage media or communication media that can be accessed by the computing device 104.

Communication media include computer-readable instructions, data structures, program modules, or other data in a modulated data signal, such as a carrier wave or other transport mechanism and include any delivery media. The term "modulated data signal" means a signal that has one or more of its characteristics changed or set in a manner so as to encode information in the signal. By way of example, and not limitation, communication media include wired media, such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and nonvolatile, removable, and nonremovable media implemented in any method or technology for storage of information, such as computer-readable instructions, data structures, program modules, or other data. For example, computer media include, but are not limited to, RAM, ROM, EPROM, EEPROM, flash memory or other solid-state memory technology; CD-ROM, digital versatile disks (DVD), HD-DVD, BLU-RAY, or other optical storage; magnetic cassettes, magnetic tape, magnetic disk storage, or other magnetic storage devices; or any other medium that can be used to store the desired information and which can be accessed by the computing device 104. For purposes of the claims, the phrase "computer storage medium," and variations thereof, do not include waves or signals per se and/or communication media.

The mass storage device 526 may store an operating system 527 utilized to control the operation of the computing device 104. According to one embodiment, the operating system comprises the Windows® operating system from Microsoft Corporation. According to further embodiments, the operating system may comprise the UNIX, Android, Windows Phone or iOS operating systems, available from their respective manufacturers. It should be appreciated that other operating systems may also be utilized. The mass storage device 526 may store other system or application programs and data utilized by the computing device 104, such as the orchestration module 114, the service relationship data 112, and/or any of the other software components and data described above. The mass storage device 526 might also store other programs and data not specifically identified herein.

In one embodiment, the mass storage device 526 or other computer-readable storage media are encoded with computer-executable instructions, which, when loaded into the computing device 104, transform the computer from a general-purpose computing system into a special-purpose computer capable of implementing the embodiments described herein. These computer-executable instructions transform the computing device 104 by specifying how the CPUs 504 transition between states, as described above. According to one embodiment, the computing device 104 has access to computer-readable storage media storing computer-executable instructions, which, when executed by the computing device 104, perform the various routines described above with regard to FIGS. 3, 4A and 4B and the other figures. The computing device 104 might also include computer-readable storage media for performing any of the other computer-implemented operations described herein.

The computing device 104 may also include one or more input/output controllers 516 for receiving and processing input from a number of input devices, such as a keyboard, a mouse, a microphone, a headset, a touchpad, a touch screen, an electronic stylus, or any other type of input device. Also shown, the input/output controllers 516 are in communication with an input/output device 525. The input/output controller 516 may provide output to a display, such as a computer monitor, a flat-panel display, a digital projector, a printer, a plotter, or other type of output device. The input/output controller 516 may provide input communication with other devices such as a microphone 530, a speaker 532, game controllers, and/or audio devices. In addition, or alternatively, a video output 522 may be in communication with the chipset 506 and operate independent of the input/output controllers 516. It will be appreciated that the computing device 104 may not include all of the components shown in FIG. 5, may include other components that are not explicitly shown in FIG. 5, or may utilize an architecture completely different from that shown in FIG. 5.

Example Clauses

A: A method comprising: identifying, at a computing device, one or more subspaces of multi-dimensional data; identifying one or more attributes of the one or more subspaces; determining a set of insight candidates to be evaluated, wherein an insight candidate is determined by an insight type, one of the identified one or more attributes, and one or more of the one or more subspaces; identifying from the set of insight candidates, a plurality of insights for one or more subspaces, wherein the identifying comprises determining that either the attribute of a first one of the one or more subspaces is different than the attribute of some other ones of the two or more subspaces by a first threshold or values of the attribute of one or more of the one or more subspaces form a significant pattern or relationship, wherein the significant pattern or relationship is evaluated based on the corresponding insight type and is evaluated against a second threshold, wherein the plurality of insights comprises insights of two or more different types; ordering the identified plurality of insights; and identifying for presentation at least a portion of the plurality of insights based at least on the ordering.

B: The method of A, wherein the two or more different types of insight are included in at least one of the following categories: numerical insights including a value; time-based insights including a time component; and compound insights including insights based on two or more subspaces.

C: The method of A or B, wherein the ordering comprises: scoring at least a portion of the plurality of insights; and ranking at least a portion of the scored plurality of insights, and wherein the at least the portion of the plurality of insights identified for presentation comprises a predetermined number of toped ranked insights of the plurality of insights.

D: The method of C, wherein the scoring comprises: determining an impact value for an individual one of the plurality of insights based at least on a importance rating of the first one of the one or more subspaces, the importance rating is based on a relevance of the subspace associated with the insight to other comparable subspaces, the method further comprising at least one of: pruning one or more of the plurality of insights in response to the corresponding impact value being below a pruning threshold value, or prioritizing further operations associated with the individual one of the plurality of insights based on the determined impact value.

E: The method of C, wherein the scoring comprises: at least one of: determining an impact value for an individual one of the plurality of insights based at least on a importance rating of the first one of the one or more subspaces, the importance rating is based on a relevance of the subspace associated with the insight to other comparable subspaces or determining a significance value of the individual one of the plurality of insights; normalizing at least one of the impact value or significance value to the range [0, 1]; and determining a score for the individual one of the plurality of insights based at least on the impact value and the significance value.

F: The method of E, further comprising: for individual ones of a top k of the plurality of insights, defining a potential function based on the associated score and at least one of a subspace distance model, an attributes distance model or an insight type distance model; and determining a new order of the top k of the plurality of insights in response to maximizing the potential function for each of the ones of the top k of the identified insights.

G: The method of A, B, C, D, E or F, wherein one or more of the plurality of insights is associated with more than one subspace.

H: The method of A, B, C, D, E, F or G, wherein the one or more other subspaces comprise at least one of a sibling relationship or a parent relationship to the identified one or more subspaces.

I: The method of A, B, C, D, E, F, G or H, wherein one or more of the plurality of insights comprise more than one pipelined attribute based on the one or more attributes.

J: The method of A, B, C, D, E, F, G, H or I, further comprising: identifying connections between two or more of the plurality of insights; and forming one or more meta insights based at least on the identified connections between at least two of the plurality of insights, the meta insights comprise a plurality of insights.

K: A system for providing insights, the system comprising: one or more processors; and a memory communicatively coupled to the one or more processors, the memory storing instructions that, when executed, cause the one or more processors to: identify one or more subspaces of multi-dimensional data; identify one or more attributes of the one or more subspaces; determine a set of insight candidates to be evaluated, wherein an insight candidate is determined by an insight type, one of the identified one or more attributes, and one or more of the one or more subspaces; identify from the set of insight candidates, a plurality of insights for one or more subspaces, wherein the identifying comprises determining that either the attribute of a first one of the one or more subspaces is different than the attribute of some other ones of the two or more subspaces by the threshold amount; or the attribute values of one or more of the one or more subspaces form a significant pattern or relationship, wherein the significance is evaluated based on the corresponding insight type and exceeds the threshold amount; wherein the plurality of insights comprises insights of two or more different types; order the identified plurality of insights; and identify for presentation at least a portion of the plurality of insights based at least on the ordering.

L: The system of K, wherein the ordering comprises: scoring at least a portion of the plurality of insights; and ranking at least a portion of the scored plurality of insights, and wherein the at least the portion of the plurality of insights identified for presentation comprises a predetermined number of toped ranked insights of the plurality of insights.

M: The system of L, wherein the scoring comprises: at least one of: determining an impact value for an individual one of the plurality of insights based at least on a importance rating of the first one of the one or more subspaces, the importance rating is based on a relevance of the subspace associated with the insight to other comparable subspaces or determining a significance value of the individual one of the plurality of insights; normalizing least one of the impact value or significance value to the range [0, 1]; and determining a score for the individual one of the plurality of insights based at least on the impact value and the significance value.

N: The system of L, wherein the scoring comprises: determining an impact value for an individual one of the plurality of insights based at least on a importance rating of a corresponding dataset of the multi-dimensional data, the importance rating is based on a relevance of the subspace associated with the insight to other comparable subspaces, further comprising at least one of: pruning one or more of the plurality of insights in response to the corresponding impact value being below a pruning threshold value, or prioritizing further operations associated with the individual one of the plurality of insights based on the determined impact value.

O: The system of K, L, M or N, the one or more processors further operable to: for individual ones of a top k of the plurality of insights, defining a potential function based on the associated score and one of a subspace distance model, an attributes distance model and an insight type distance model; and determining a new order of the top k of the plurality of insights in response to maximizing the potential function for each of the ones of the top k of the identified insights.

Based on the foregoing, it should be appreciated that technologies for providing action orchestration of computing entities in a complex network are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method comprising: identifying, at a computing device, one or more subspaces of multi-dimensional data;
    identifying, from the multi-dimensional data, an attribute of the one or more subspaces;
    determining a set of insight candidates to be evaluated, wherein an insight candidate is characterized by an insight type;
    identifying from the set of insight candidates, a plurality of insights for one or more subspaces, wherein the identifying comprises determining that
        the attribute of a first subspace is different than the attribute of a second subspace by a threshold
        wherein the set of insight candidates comprises insights of two or more different types;
    ordering the identified plurality of insights; and
    identifying for presentation at least a portion of the plurality of insights based at least on the ordering.

2. The method of claim 1, wherein the two or more different types of insight are included in at least one of the following categories:
    numerical insights including a value;
    time-based insights including a time component; and
    compound insights including insights based on two or more subspaces.

3. The method of claim 1, wherein the ordering comprises:
    scoring at least a portion of the plurality of insights; and
    ranking at least a portion of the scored plurality of insights, and
    wherein the at least the portion of the plurality of insights identified for presentation comprises a predetermined number of top-ranked insights of the plurality of insights.

4. The method of claim 3, wherein the scoring comprises:
    determining an impact value for an individual one of the plurality of insights based at least on a importance rating of the first one of the one or more subspaces, the importance rating is based on a relevance of the subspace associated with the insight to other comparable sub spaces,
    the method further comprising at least one of:
        pruning one or more of the plurality of insights in response to the corresponding impact value being below a pruning threshold value, or
        prioritizing further operations associated with the individual one of the plurality of insights based on the determined impact value.

5. The method of claim 3, wherein the scoring comprises:
    at least one of:
        determining an impact value for an individual one of the plurality of insights based at least on a importance rating of the first one of the one or more subspaces, the importance rating is based on a relevance of the subspace associated with the insight to other comparable subspaces or
        determining a significance value of the individual one of the plurality of insights;
    normalizing at least one of the impact value or significance value to the range [0, 1]; and
    determining a score for the individual one of the plurality of insights based at least on the impact value and the significance value.

6. The method of claim 5, further comprising:
    for individual ones of a top k of the plurality of insights, defining a potential function based on the associated score and at least one of a subspace distance model, an attributes distance model or an insight type distance model; and
    determining a new order of the top k of the plurality of insights in response to maximizing the potential function for each of the ones of the top k of the identified insights.

7. The method of claim 5, wherein the significance value is at least partially based on the extent to which the individual insight is determined to be uncommon.

8. The method of claim 1, wherein one or more of the plurality of insights is associated with more than one subspace.

9. The method of claim 1, wherein the one or more other subspaces comprise at least one of a sibling relationship or a parent relationship to the identified one or more subspaces.

10. The method of claim 1, wherein one or more of the plurality of insights comprises more than one pipelined attribute based on the one or more attributes.

11. The method of claim 1, further comprising:
    identifying connections between two or more of the plurality of insights; and
    forming one or more meta insights based at least on the identified connections between at least two of the plurality of insights, the meta insights comprise a plurality of insights.

12. The method of claim 1, wherein the attribute is a piped attribute and wherein identifying the piped attribute comprises:
    performing a first calculation on the multi-dimensional data to generate a first attribute; and
    performing a second calculation on the first attribute to generate the piped attribute.

13. A system for providing insights, the system comprising:
one or more processors; and
a memory communicatively coupled to the one or more processors, the memory storing instructions that, when executed, cause the one or more processors to:
identify one or more subspaces of multi-dimensional data;
identify, from the multi-dimensional data, one or more an attribute of the one or more subspaces;
determine a set of insight candidates to be evaluated, wherein an insight candidate is characterized by an insight type;
identify from the set of insight candidates, a plurality of insights for one or more subspaces, wherein the identifying comprises determining that
the attribute values of a first subspace form a significant pattern or relationship with the attribute values of a second subspace, wherein the significance is evaluated based on the corresponding insight type and exceeds a threshold amount;
wherein the set of insight candidates comprises insights of two or more different types;
order the identified plurality of insights; and
identify for presentation at least a portion of the plurality of insights based at least on the ordering.

14. The system of claim 13, wherein the ordering comprises:
scoring at least a portion of the plurality of insights; and
ranking at least a portion of the scored plurality of insights, and
wherein the at least the portion of the plurality of insights identified for presentation comprises a predetermined number of top-ranked insights of the plurality of insights.

15. The system of claim 12, wherein the scoring comprises:
at least one of:
determining an impact value for an individual one of the plurality of insights based at least on a importance rating of the first one of the one or more subspaces, the importance rating is based on a relevance of the subspace associated with the insight to other comparable subspaces or
determining a significance value of the individual one of the plurality of insights;
normalizing least one of the impact value or significance value to the range [0, 1]; and
determining a score for the individual one of the plurality of insights based at least on the impact value and the significance value.

16. The system of claim 14, wherein the scoring comprises:
determining an impact value for an individual one of the plurality of insights based at least on a importance rating of a corresponding dataset of the multi-dimensional data, the importance rating is based on a relevance of the subspace associated with the insight to other comparable subspaces,
further comprising at least one of:
pruning one or more of the plurality of insights in response to the corresponding impact value being below a pruning threshold value, or
prioritizing further operations associated with the individual one of the plurality of insights based on the determined impact value.

17. The system of claim 14, wherein the scoring comprises:
determining an impact value for an individual one of the plurality of insights based at least on an importance rating of the first one of the one or more subspaces, wherein the importance rating is based on a relevance of the subspace associated with the insight to other comparable subspaces;
determining a significance value of the individual one of the plurality of insights;
normalizing least one of the impact value or significance value to the range [0, 1]; and
determining a score for the individual one of the plurality of insights based at least on the impact value and the significance value.

18. The system of claim 13, the one or more processors further operable to:
for individual ones of a top k of the plurality of insights, defining a potential function based on the associated score and one of a subspace distance model, an attributes distance model and an insight type distance model; and
determining a new order of the top k of the plurality of insights in response to maximizing the potential function for each of the ones of the top k of the identified insights.

19. The system of claim 13, wherein the pattern or relationship is at least partially based on a positive or negative correlation between one or more of the one or more subspaces.

20. The system of claim 13, wherein the insight type is at least one of:
a trend;
an outstanding value;
a correlation;
a change point; or
an outlier.

* * * * *